Jan. 30, 1962  J. L. STRATTON  3,018,786
SAFETY BRAKE VALVE
Filed Jan. 23, 1959
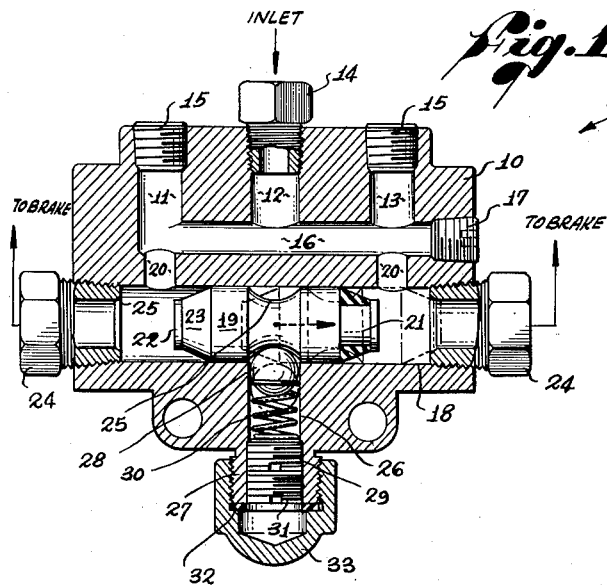
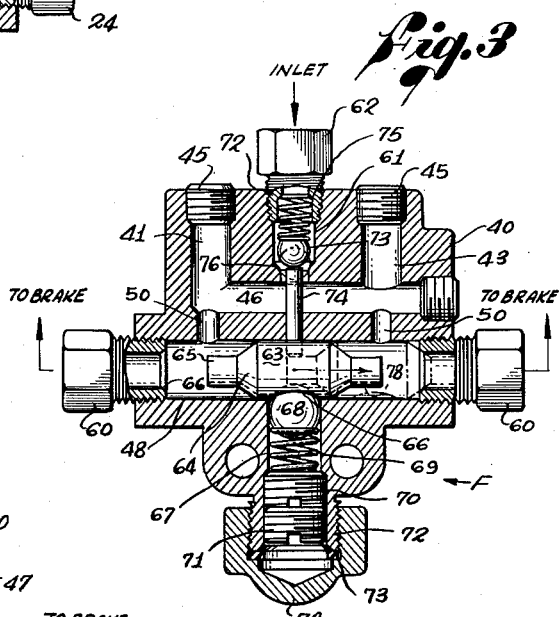
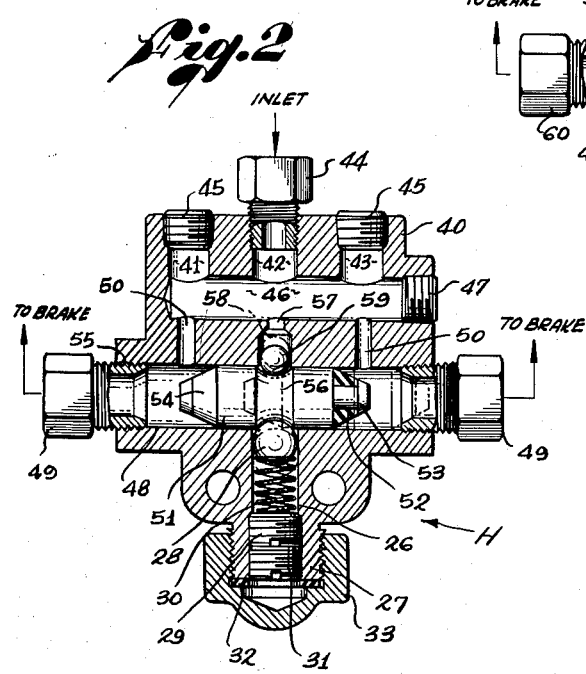
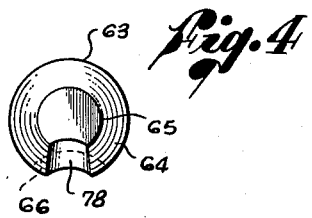
INVENTOR.
JAMES L. STRATTON
BY
Attorneys

# United States Patent Office 3,018,786
Patented Jan. 30, 1962

3,018,786
SAFETY BRAKE VALVE
James L. Stratton, Los Angeles, Calif.
Filed Jan. 23, 1959, Ser. No. 788,589
7 Claims. (Cl. 137—118)

This is a continuation-in-part of my copending application Serial No. 488,596 filed February 16, 1955, now abandoned, for Hydraulic Brake Safety Device.

The present invention relates generally to safety brake valves for motor vehicles, and, more particularly, to an improved valve of this type that automatically interrupts fluid pressure communication between a source of pressure and a defective line or brake, thereby preserving fluid for application to remaining operative brakes.

An object of my invention is to provide a valve of this type that is adaptable to use with either hydraulic or air braking systems.

Another object of my invention is to provide a safety brake valve that will not affect the normal operation of a braking system as long as there is no leak within the system whereby the response time of the braking system is unaffected.

A still further object of the invention is to provide a valve of this type that will respond susbtantially instantaneously upon actuation of the brakes when a leak occurs in the system.

It is also an object of the invention to provide an automatic safety valve of this type that can be incorporated into the braking system of both new and used vehicles, the valve being extremely light in weight as compared to previously available automatic safety brake devices so as to not subtract from the payload of the vehicle.

Yet another object of the present invention is to provide a safety brake valve of this type that has exteriorly available adjustment means adapted to impose a very fine balance on the valve whereby normal surges in the system do not cause operation of the valve, while upon the occurrence of a leak in the system the valve closes substantially instantaneously upon actuation of the brakes.

Another object of the invention is to provide a valve of this type that will automatically close off a defective portion of a brake system so as to permit retention of other operative portions of the system in which no leak has occurred.

It is also an object of the invention to provide a safety brake valve of this type that can be adapted for use with rear axles, front axles, or combinations of front and rear axles so as to permit use of the brakes at one wheel of a rear axle, or to retain use of both wheel brakes of a rear axle while a defective front axle brake system is shut off.

A still further object of the invention is to provide a valve of this type which is adaptable for use in braking systems in which the portions of the system operatively associated with a front axle are of a different size than portions of the system operatively associated with other axles of the vehicle.

These and other objects and advantages of my invention will be apparent from the following description when taken in conjunction with the annexed drawing in which:

FIGURE 1 is a sectional view taken through the median plane of the body of a rear axle safety brake valve that is specifically adapted for use in air brake systems;

FIGURE 2 is a sectional view taken along the median plane of the body of a rear axle safety brake valve specifically adapted for use in hydraulic braking systems;

FIGURE 3 is a sectional view taken along the median plane of the body of a hydraulic safety brake valve specifically adapted for use on front axles; and FIGURE 4 is an end view, on an enlarged scale, of the valve member shown in FIGURE 3.

Referring to the drawing and in particular to FIGURE 1, there is shown an air safety brake valve designated generally by the letter A. One valve A is applied to each axle of a vehicle other than the front axle and is installed in direct communication with the outlet port of the usual emergency relay valve or the like. The pair of conventional air brake chambers on each axle are connected through suitable air hoses to a pair of opposite outlet ports of the valve A. In the event of failure of any portion of the rear axle brake system intermediate one of the brakes and one of the outlet ports of the valve A the defective portion of the system is immediately isolated upon application of the brakes so that braking power is retained in the remaining portion of this axle system.

More specifically, the valve A has a forged body 10 of generally oblong configuration. In the upper end of the body 10 a plurality of inlet pasages 11, 12 and 13 are formed. When the valve A is to be utilized with an emergency relay valve having a single outlet port this outlet port is connected to the central pasage 12 while the outside pair of inlet passages 11 and 13 are closed by a pair of suitable threaded plugs 15, the passage 12 being provided with a threaded adaptor 14. When the valve A is used with an emergency relay valve having a pair of outlet ports, it will be understood that the central inlet passage 12 is closed by a plug 15 while the other inlet passages 11 and 13 are provided with a pair of the adaptors 14.

At their inner ends of the inlet passages 11, 12 and 13 open into communication with an equalizing passage 16. The passage 16 is a blind bore extending lengthwise of the body 10 and sealed at its outer end with a plug 17. In order to asure that there will be no delay in the transmission of pressure fluid or air through the valve A, the passage 16 has a diameter of at least one-half that of the inlet passages 11, 12 and 13.

At its bottom end the body 10 is formed with an enlarged bore 18 extending therethrough that is parallel to the passage 16. This bore serves as a valve chamber for reciprocably slidably supporting a valve member 19. A pair of distributing passages 20 of equal size intercommunicate the opposite ends of the equalizing passage 16 and opposite ends of the valve chamber. The distributing passages 20 comprise coaxial extensions of the inlet passages 11 and 13 and have substantially the same diameter as the air hoses (not shown) leading from the valve A to the opposite rear axle brakes. With this arrangement, precisely equal fluid pressures are imposed on opposite ends of the valve number 19 when the brakes are operated and if no leaks have occurred in the system these balanced fluid pressures maintain the valve member 19 in a neutral position.

The valve member 19 is a substantially cylindrical body having an overall axial length equal to the spacing between the pair of distributing passages 20 at both ends. The member 19 is formed with a pair of reduced diameter necks 21, each of which terminates in a circumferential flange or cap 22 which can also be an integral portion of the valve member. An annular sealing ring 23 is adapted to be mounted on each neck 21 between the cap 22 and the body of the valve member and is formed with a frustoconical outer surface. A pair of adaptors 24 are threadedly inserted in opposite ends of the valve chamber bore 18 and each of these on its inner end is formed with a valve seat 25 adapted to seat the sealing rings 23.

It will be understood that the hoses leading from the pair of adaptors 24 extend to a pair of air chambers of different brakes on the same axle. Since different brakes on the same vehicle do not ordinarily wear evenly, when fluid pressure is applied the pair of brake chambers connected to the adaptors 24 will undergo different expansions. This leads to surges of fluid pressure within the system so that a corresponding imbalance of forces may be imposed on the valve member 19 tending to shift it to one or the other ends of the valve chamber. In order to insure that such normal surges will not cause operation of the valve A, while at the same time insuring that in the event of any leak downstream from either of the adaptors 24 the valve A will operate, I have provided a means for yieldably maintaining the valve member 19 in the neutral position shown in solid outline in FIGURE 1. This means is exteriorly adjustable and can be set for a very fine limit so that when the pressure differential across opposite ends of the valve member 19 exceeds the predetermined limit the valve member will instantaneously move to one end or the other of the valve chamber to close one or the other of the adaptors 24.

The valve member 19 is formed with a central circumferentially extending groove 25 of concave configuration. When the valve member 19 is in neutral position, the groove 25 is in concentric registration with a bore 26 that extends from the valve chamber bore 18 to open into an exteriorly threaded boss 27 integrally formed on the bottom end of the valve body 10. It will be noted that the bore 26 has a diameter substantially equal to the width of the groove 25 and is adapted to slidably contain a retaining ball 28. An adjustment screw 29 is threadedly insertable into the lower end of the bore 26 by means of which the compressive force of a coil spring 30 interposed between the screw 29 and ball 28 can be adjusted. To maintain the adjustment of the spring 30, a lock screw 31 is threadedly insertable on the bore 26 behind the screw 29. To provide a fluid seal at the lower end of the bore 26, a sealing washer 32 is interposed between the end of the boss 27 and a cap nut 33.

It will be noted that the radius of the ball 28 is less than both the radial depth and radius of the groove 25. Accordingly, when the pressure differential across opposite ends of the valve member 19 exceeds the predetermined limit for which the spring 30 has been set, the groove 25 is enabled to cam the ball 28 downwardly into the bore 26 to override the ball as the valve member advances to a closing position.

Particular attention is drawn to the size relationship of the inlet passages 11, 12 and 13, the equalizing passages 16, the pair of distributing passages 20, the valve chamber bore 18, and the adaptors 24 which are adapted to receive air hoses of substantially the same size as passages 20. In this connection the interposition of the equalizing passage 16 and pair of distributing passages 20 between the source of fluid pressure and opposite ends of the valve member 19 is important for successful operation of the valve A. When air pressure is introduced into the valve, either through the single inlet passage 12 or alternatively the pair of inlet passages 11 and 13, the equalizing passage 16 insures that the fluid pressures exiting from the pair of distributing passages 20 will be precisely equal to one another. Corresponding balanced pressures are thus imposed on opposite ends of the valve member 19, the pressures being increased due to the enlarged diameter of the bore 18. In the normal operation of the brake system these opposed increased balanced pressures will prevent any oscillating tendency of the valve mmeber 19 and this stability of the valve member 19 in turn assures that there will be no change in volume in the valve chamber bore 18 between each adaptor 24 and one end of the valve member 19. With this arrangement the presence of the valve A in an air brake system having no leaks is not detectable upon operation of the brakes and the response time involved in the normal operation of the brake system is absolutely unimpaired.

In the event of a leak in any portion of the braking system downstream from either one of the adaptors 24, the equalizing passage 16 and pair of distributing passages 20 will nevertheless insure that substantially equal fluid pressures are delivered from the passages 20. Assuming that a leak has occurred in the system downstream from the right-hand adaptor 24, any tendency of air to flow through the right-hand distributing passage 20 at a rate different than through the left-hand passage 20 will be reflected in the pressure of the fluid within the equalizing passage 16. Since the equalizing passage 16 is in communication with both distributing passages 20, it acts somewhat like an equalizing manifold or accumulator, perpetually tending to equalize the pressure fluid passing out of both distributing passages 20.

When the brake connected to the unimpaired system downstream from the left-hand adaptor 24 has been actuated, the pressure of the fluid in the left-hand end of the valve chamber bore 18 is immediately increased whereby the ball 28 is cammed out of the way in response to movement of the valve member 19 into the dotted line position shown in FIGURE 1, closing the right hand passage 20 and adaptor 24. This movement of valve member 19 occurs substantially instantaneously upon actuation of the remaining operative brake. Since the volume of the brake chamber on the left-hand end of the valve chamber 18 is enlarged concurrently with movement of the valve member a corresponding increase in the fluid pressure on the left-hand end of the valve member 19 occurs and a concommitant decrease in volume and pressure in the right-hand of the valve chamber. By this means I achieve an extremely sensitive very quickly responding emergency or automatic safety brake valve.

Attention is drawn to the relative positions of the spring-loaded ball 28 and valve member 19 when the valve member is in a closed position. This is indicated in dotted outline in FIGURE 1 and it will be observed that the ball 28 engages a portion of the frusto-conical surface of one of the sealing rings 23. It will be appreciated that the seal ring 23, being made of a somewhat compressible elastomeric material such as Neoprene, will yield somewhat to the spring-loaded ball 28 which thereby augments fluid pressures in the valve chamber bore 18 in maintaining the valve member 19 in a closed position, whereby continued use may be made of the remaining operative brake.

In FIGURE 2 my invention is shown as embodied in a valve designated generally by the letter H which is adapted for use in protecting the rear axle brakes of a vehicle having a hydraulic brake system. The valve H is substantially similar to the valve A in construction and mode of operation, but is particularly adapted to use with the incompressible pressure fluid. Because of this difference in the nature of the fluid medium, I have provided another form of surge control means.

The valve H and the internal passages and parts thereof are similar to, although generally smaller than the corresponding parts of the valve A and, therefore, will not be described in detail. There are, however, certain critical differences to which particular attention will be given.

The valve H has a generally oblong body 40 formed with a plurality of inlet passages 41, 42, and 43 in its upper end. The valve H replaces a rear distribution block or T-fitting in a hydraulic brake system and is adapted for connection to a master cylinder or the like having either one or a pair of outlet ports. In the present instance it is assumed that the master cylinder has but one outlet port and, accordingly, the central inlet passage 42 has an adaptor 44 threadedly received in the outer end thereof, into which the master cylinder outlet port conducts the hydraulic fluid. The parallel outside pair of inlet passages 41 and 43 are sealed at their outer ends by a pair of threaded plugs 45.

At their inner ends the inlet passages 41, 42 and 43 communicate with an equalizing passage 46 comprising a blind bore extending lengthwise of the body 40 and sealed at its outer end with a plug 47. It will be observed that the equalizing passage 46 is approximately the same size as the inlet passages 41, 42 and 43. A valve chamber bore 48 is formed through the lower end of the body 40 parallel to the equalizing passage 46. At its opposite ends the bore 48 threadedly receives a pair of adaptors 49 to which a pair of tubes (not shown) can be connected for conducting the hydraulic fluid to the cylinders of the pair of rear wheel brakes.

A pair of parallel distributing passages 50 intercommunicate opposite ends of the equalizing passage 46 to opposite ends of the valve chamber bore 48. These passages 50 comprise coaxial extensions of the inlet passages 41 and 43 and it will be observed that they are of a reduced diameter relative to the equalizing passage 46. Within the valve chamber bore 48 a substantially cylindrical valve member 51 is reciprocably, slideably mounted. At its opposite ends the valve member 51 is formed with integral reduced diameter neck portions 52, each of which terminates in an integral cap 53. An annular seal ring 54 of an elastomeric material is adapted to be seated between the cap 53 and the body of the valve 51 around the neck 52. It will be observed that the outer face of the seal ring 54 is of frusto-conical configuration, as is the periphery of the cap 53, the seal ring 54 and periphery of the cap 53 defining a common frusto-conical surface adapted for seating in a complementary seat 55 formed on the inner ends of each of the adaptors 49.

The size of the pair of distributing passages 50 is dependent upon the size of the lines of the conduits extending from the adaptors 49 to the brake wheel cylinders. Each of the passages 50 is preferably of the same size as the internal cross-sectional area of these conduits. Unlike the arrangement shown in the valve A, in the present instance the equalizing passage 46 has a diameter substantially greater than that of the distributing passages 50 so that the passages 50 can act as restrictors for fluid passing therethrough from the passage 46.

Due to the incompressible nature of the hydraulic fluid, any surges within the braking system are very forcefully and quickly transmitted to opposite ends of the valve member 51. In order to prevent a closing motion of the valve member 51 in response to such momentary surges, while at the same time maintaining a highly sensitive safety valve that will close immediately in the event of any leak in the system, I employ fluid pressure from the equalizing passage 46 to aid in holding the valve member 51 in neutral position.

The valve H, like the valve A, is formed in its lower end with a bore 26 opening into a boss 27 and adapted to contain the ball 28, adjustment spring 30, adjusting screw 29, and lock screw 31, the boss 27 being adapted to mount the sealing washer 32 and cap nut 33. The valve member 51 is formed with a central circumferentially-extending groove 56 of concave configuration that is adapted to cam the ball 28 into the bore 26 upon axial movement of the valve member 51. A counterbore 58 extends between the equalizing passage 46 and the valve chamber bore 48 in coaxial alignment with the inlet passage 42 and the bore 26. The upper end of this counterbore has a reduced diameter substantially the same as the diameter of the distributing passages 50 while the enlarged lower end of the counterbore provides a pocket 58 adapted to slidably contain a surge ball 59 which is smaller than the ball 28. The valve member groove 56 has a depth less than the radius of the surge ball 59. The pocket 58 has a depth sufficient to completely receive the full diameter of the surge ball 59 when the surge ball is cammed into the pocket in response to axial movement of the valve member 51.

When the brake system is actuated and the fluid pressure is admitted into the equalizing passage 46, a portion of the fluid pressure is exerted through the counterbore 57 on the upper end of the surge ball 59. This pressure on the ball 59, as well as the force of the spring-loaded ball 28, combine to resist any momentary fluid pressure differential across opposite ends of the valve member 51, due to normal surging in the hydraulic brake lines.

Upon a leak occurring downstream from either of the adaptors 49, a uniform reduction of fluid pressure takes place throughout the equalizing passage 46, thereby reducing the pressure imposed upon the surge ball 59. If the brakes are then applied, the valve member 51 is actuated in the manner previously described in conjunction with actuation of the valve member of the air valve A. When the pressure differential on opposite ends of the valve member 51 exceeds the reduction in force of the surge ball 59, the valve member 51 moves to the dotted line position indicated in FIGURE 2. The right hand distributing passage 50 is then closed by the valve member 51 while the other distributing passage 50 and the counterbored passage 57 are subjected to fluid pressure forces upon subsequent actuation of the brake system. Such subsequent applications of the remaining brake involve applications of fluid pressure to the surge ball 59 which then aids the spring-loaded ball 28 in maintaining the valve member 51 in the closed position.

It should also be noted that when the valve member 51 is actuated to displace both the surge ball 59 and the ball 28 fluid within the bore 26 can be displaced by the ball 28 between the valve member 51 and the wall of the bore 48. Fluid displaced by the surge ball 59 can likewise bleed between the valve member and the valve chamber bore, as well as into the equalizing passage 46. In this connection it will be observed that displacement of the surge ball 59 induces a surge within the equalizing passage 46 and the left hand distributing passage 50 and this surging force augments the pressure differential between opposite ends of the valve member 51 in moving the valve member to a closed position very quickly.

It will be seen that the combination of the fluid pressure-loaded surge ball 59 and spring-loaded adjustment ball 28 permits a very fine adjustment to precisely control the pressure differential required to actuate the valve member 51. If reliance were to be placed on either of these valve member retaining means alone, the valve would be so insensitive as to permit escape of an undue amount of hydraulic fluid through a leaky line before the valve closed whereby the loss of fluid might prevent subsequent actuation of the brakes. With the arrangement provided in the valve H, a relatively light and sensitive adjustment spring 30 can be employed to maintain the total valve member retaining force within a very narrow tolerance.

In FIGURE 3 my invention is embodied in a valve adapted for installation on the front axle of a vehicle having a hydraulic brake system. It will be appreciated that in this environment if a rupture occurs in any part of the front axle brake system the hydraulic fluid must be excluded from both wheels so as to avoid the possibility of an abrupt swerve of the vehicle. Therefore, the valve F must be adapted to instantaneously automatically close in the event of a leak in the front axle brake system and at the same time be prevented from closing in response to the normal momentary surges in the brake system.

The valve F utilizes the valve body 40 of the valve H formed with the equalizing passage 46, the pair of distributing passages 50 and the valve chamber bore 48. A pair of adaptors 60 are threadedly mounted in opposite ends of the valve chamber bore 48 and a pair of suitable conduits (not shown) serve to intercommunicate opposite ends of the valve chamber to the brake wheel cylinders at opposite ends of the front axle, through the adaptors 60. It will be understood that these conduits have substantially the same internal diameter as the pair of passages or distributing passages 50 so as to preserve the same relationship prescribed with respect to the valve H.

In the usual case, the valve H is intended to replace the front distribution block or T and, accordingly, the pair of inlet pasages 41 and 43 are sealed by the plugs 45. Between the passages 41 and 43 a central inlet passage 61 extends outwardly from the equalizing passage 46 to open into the upper end of the valve body 40. At its outer end the inlet passage 61 is adapted to threadedly receive a fitting 62 which, in turn, communicates with the source of hydraulic fluid.

A generally cylindrical valve member 63 is reciprocably, slideably mounted in the valve chamber bore 48. At opposite ends of its central body portion the valve member 63 has integrally formed, tapered, frusto-conical sections 64 that develop into integrally formed, reduced diameter, cylindrical necks 65 at extreme opposite ends of the valve member. The opposite end neck portions 65 are of a lesser diameter than the passage through the adaptors 60 so as to be receivable therein. The tapered sections 64 have a taper complementary to that of seats 66 formed on the inner ends of the adaptors 60 so that when the valve member 63 is moved to a closed position a substantially fluid-tight seal is formed.

In its center the valve member 63 is formed with a concave cavity 66 that has a uniform spherical radius. A bore 67 is formed in the lower end of the valve body 40 in coaxial alignment with the inlet passage 61 and is adapted to slideably contain a ball 68 that is adapted to seat itself within the cavity 66, the ball 68 preferably having the same radius as the cavity 66. A coil spring 69 is mounted in the bore 67 beneath the ball 68 and is adjustable as to compressive force by an adjustment screw 70 threadedly inserted in the bore 67 and maintained in adjusted position by lock screw 71 therebehind. A boss 72 into which the bore 67 opens mounts a sealing washer 73 within a cap nut 74 to define a fluid seal.

Comparing the valve member 63 to the valve member 51 of FIGURE 2, it will be observed that the cavity 66 is relatively shallow as compared to the annular or circumferential groove 56 of the valve member 51. It will be seen also that the ball 68 is somewhat larger than the ball 28 of the valve H. With this arrangement, assuming the valve members 63 and 51 to be of the same diameter, a lesser axially directed force is required to cam the ball 68 out of the path of the valve member 63 than is required to cam the ball 28 out of the path of the valve member 51 (ignoring for the moment the additional valve member retaining means of the valve H and the valve F). The valve member 63 is thus adapted to be extremely sensitive to the effect of slight pressure differentials on opposite ends thereof. Accordingly, if a leak is assumed downstream from the right hand adaptor 60, the valve member 63 is adapted to move into the closed or dotted line position shown in FIGURE 3 before the unimpaired brake downstream from the left hand adaptor 60 has had an opportunity to set, and dangerous swerving of the steerable front wheels is thereby prevented. After the valve member 63 has moved to the closed dotted line position, but before the operative brake downstream from the left hand adapter 60 can set, the valve F will have prevented any additional fluid pressure being imposed on the operative brake.

To maintain the desired extreme sensitivity of the valve member 63, and to avoid actuation of the valve in response to momentary surges of fluid pressure, and also to completely close the valve F in the event of a leak in the front axle brake system, I have provided a combined surge control and check valve means in the valve F. This means takes the form of a spring 72, ball check valve 73, and ball support rod 74, all of which are mounted in coaxial alignment with the inlet passage 61 and the bore 67.

The adaptor 62 is formed with a downwardly facing shoulder 75 that seats one end of the spring 72, the other end of the spring being in engagement with the ball check 73. At its lower end, the inlet passage 61 is counterbored to define a seat 76 that is adapted to receive the ball check 73 in fluid sealing engagement. The support rod 74 is slidably mounted in a bore 77 that extends between the equalizing passage 46 and the valve chamber bore 48. The length of the support rod 74 is such that when the valve member 63 is in neutral position the ball check 73 is held out of engagement witht the seat 76 against the force of the spring 72. When the valve F is actuated and the valve member 63 and support rod 74 have been moved to the dotted outline positions shown in FIGURE 3, the spring 72 and incoming fluid pressure can move the ball check 73 into fluid sealing engagement with the seat 76.

For resetting the valve F after it has been automatically actuated, the adaptor 60 against which it has moved is first removed and a screwdriver or the like then pushed against the adjacent end of the valve member 63. To insure that the cavity 66 will remain in alignment with the ball 68, the valve member 63 is formed with a shallow concave groove 78 extending from opposite ends of the valve inwardly to merge into the cavity 66. This groove 78 has substantially the same radius as the ball 68 whereby the depth of penetration of the ball 68 or abutment area of the ball 68 and cavity 66 is further diminished, thus increasing the sensitivity of the valve member 63 to pressure differentials across the opposite ends thereof. As is shown in FIGURE 4, slightly exaggerated, the radially innermost point of the cavity 66 is more remote from the axis of the valve member 63 than are the radially innermost points of the portions of the groove 78 which are formed in the necks 75 of the valve member.

In the operation of the valve F when no leaks are present in the front axle brake system, the incoming fluid pressure exerts a force on the ball 73 and rod 74 to hold the valve member 63 against displacement in response to momentary surges in the brake system, this force being augmented by the spring-biased ball 68. When a leak occurs downstream of one of the adaptors 60, as for example the right hand adaptor 60, the presence of the leak increases the rate of flow of the fluid through the inlet passage 61, the equalizing passage 46, and the pair of distributing passages 50, whereby the fluid pressure within these passages undergoes a marked reduction. A portion of the fluid pressure force formerly imposed on the ball check 73 and support rod 74 is thereby lost and the rod 74 and ball 68 then offer such little resistance to axial movement of the valve member 63 that before the brake downstream from the left hand adaptor 60 can become fully engaged, the valve member 63 is caused to move into fluid-sealing engagement with the right hand adaptor 60 closing the right hand passage 50. Concurrently with seating of valve member 63, the ball check 73 and rod 74 move to the dotted outline positions shown whereby the seat 76 is closed. The transmission of any additional fluid pressure to the remaining operative brake is thereby effectively interrupted before sufficient pressure can be delivered thereto to cause the brake to become engaged. The valve F then remains fully closed so that no additional fluid can be lost from this system whereby the saved fluid can be utilized on a rear axle of the vehicle.

Although I have disclosed a variety of embodiments of my invention herein, it is to be understood that I do not mean to be limited to the specific details of construction herein shown and described, but only as limited by the scope and spirit of the following claims.

I claim:
1. A safety brake valve comprising: a valve body formed with a fluid inlet passage means, an equalizing passage in communication with said inlet means, a valve chamber and a pair of distributing passages of equal size interconnecting opposite ends of said chamber to said equalizing passage, said chamber being larger in cross-sectional area than said pair of distrbuting passages; a pair of adapters connected to opposite ends of said chamber; a valve member axially movably mounted in said chamber and positioned to alternatively close one of said adapters; an exteriorly adjustable restraining means to yieldably maintain said valve member in a neutral position in said chamber to permit unobstructed fluid communication through opposite ends of said chamber between said pair of distributing passages and said pair of adapters; and a check valve means for said fluid inlet means and operatively associated with said valve member to be held open by said valve member only when said valve member occupies said neutral position and positioned to yieldably hold said valve member in neutral position with a force proportional to the pressure of fluid in said inlet passage means to aid said adjustable means in preventing movement of said valve member out of neutral position in response to momentary surges of fluid pressure in said valve, a leak downstream from one of said adapters causing a reduction in fluid pressure within said fluid inlet means and a corresponding reduction in the force exerted by said check valve means on said valve member whereby closing movement of said valve member is effected in response to a pressure differential across the opposite ends of said valve member, said check valve means being positioned to close substantially concurrently with closing of said valve member to prevent further introduction of pressure fluid into said valve.

2. A device as set forth in claim 1 in which said check valve means and adjustable means are concurrently engageable with an end portion of said valve member when said valve member closes either one of said adapters, said check valve means, said adjustable means, and the opposite ends of said valve member being positioned to yieldably prevent withdrawal of said valve member from a closed position.

3. A device as set forth in claim 1 in which said check valve means includes a check valve member that is yieldably biased towards a closed position and a rigid member that extends between said check valve member and said valve member and having a length sufficient to prevent closing of said check valve member when said valve member is in said neutral position.

4. A safety brake valve comprising: a valve body formed with a fluid inlet means, an equalizing passage in communication with said inlet means, a valve chamber with opposite-end outlets, and a pair of distributing passages to interconnect opposite ends of said chamber to said equalizing passage; a valve member movably mounted in said chamber to alternatively close one of said outlets; an exteriorly adjustable restraining means to yieldably maintain said valve member in a neutral position in said chamber, said valve member being positioned to provide fluid communication through opposite end portions of said chamber between said pair of distributing passages and said outlets of said chamber; valve means; and means to hold said valve means in an open position, said valve means being responsive to movement of said valve member to a closed position on one of said outlets to close said fluid inlet means.

5. In a brake valve: a valve body formed with a fluid inlet, a valve chamber with opposite end outlets and distributing passages to interconnect opposite ends of said chamber to said inlet; a valve member movably mounted in said chamber to alternatively close one of said outlets; valve means in said fluid inlet means; and means to hold said valve means in an open position, said valve means being responsive to movement of said valve member to a closed position on one of said outlets to close said fluid inlet.

6. In a brake valve: a valve body formed with a fluid inlet passage, a valve chamber with opposite end outlets and distributing passages to interconnect opposite ends of said chamber to said inlet passage; a valve member movably mounted in said chamber to alternatively close one of said outlets; valve means in said inlet passage; and holding means extending between said valve means and said valve member to hold said valve means open when said valve member is in a neutral position in said chamber, in which position said valve member is positioned to provide fluid communication through opposite end portions of said chamber between said distributing passages and said outlets of said chamber, said valve means being responsive to movement of said valve member to a closed position on one of said outlets to close said inlet passage.

7. A safety brake valve comprising: a valve body formed with a fluid inlet passage, an equalizing passage in communication with said inlet passage, a valve chamber having a pair of opposite end outlets, and a pair of distributing passages interconnecting opposite ends of said chamber with said equalizing passage; a valve member reciprocable in said chamber and positioned to alternatively close one of said outlets; restraining means to yieldably maintain said valve member in a neutral position in said chamber to permit unobstructed fluid communication through opposite ends of said chamber between said pair of distributing passages and said pair of outlets; and a check valve means for said fluid inlet passage and operatively associated with said valve member to be held open only when said valve member occupies said neutral position, said check valve means being positioned to close in response to closing movement of said valve member.

References Cited in the file of this patent

UNITED STATES PATENTS

| 1,609,641 | Christensen | Dec. 7, 1926 |
| 1,936,504 | Foster | Nov. 21, 1933 |
| 2,381,484 | Blank | Aug. 7, 1945 |
| 2,386,585 | Blank | Oct. 9, 1945 |
| 2,534,871 | Lichtman | Dec. 19, 1950 |
| 2,764,176 | Darquier | Sept. 25, 1956 |

FOREIGN PATENTS

| 349,520 | Great Britain | May 27, 1931 |